United States Patent [19]
Findley et al.

[11] 3,852,057

[45] Dec. 3, 1974

[54] METHOD FOR CONTROLLING AXILLARY SHOOTS OF TOBACCO PLANTS

[75] Inventors: Thomas W. Findley, La Grange; John F. Benner, Chicago, both of Ill.

[73] Assignee: Swift & Company, Chicago, Ill.

[22] Filed: May 3, 1965

[21] Appl. No.: 452,881

[52] U.S. Cl. .................................. 71/78, 71/76
[51] Int. Cl. ............................................. A01n
[58] Field of Search .................. 71/78, 76, 122, 124

[56] References Cited
UNITED STATES PATENTS

| | | | |
|---|---|---|---|
| 3,326,664 | 6/1967 | Tso | 71/78 |
| 3,340,040 | 9/1967 | Tso | 71/78 |
| 3,713,804 | 1/1973 | Moccia | 71/DIG. 1 |

*Primary Examiner*—James O. Thomas, Jr.
*Attorney, Agent, or Firm*—Edward T. McCabe; Charles E. Bouton; J. C. Langston

[57] ABSTRACT

Hydroxy ethers and halogen containing hydroxy ethers are disclosed for use in controlling the growth of axillary shoots of tobacco plants.

3 Claims, No Drawings

METHOD FOR CONTROLLING AXILLARY SHOOTS OF TOBACCO PLANTS

This invention relates to a method of treating plants or portions of plants to control their growth. A specific embodiment concerns a method for the control of axillary shoots on tobacco plants.

Control of growth of plants or portions of plants can be used to increase yields, improve quality, decrease use of nutrients, improve the time and ease of harvesting and/or processing of crops and improve the appearance of decorative plants. In the case of tobacco plants, it is known that the quality of the leaves is improved by removal of the top portion containing the flower, a process known as topping. The purpose of topping is to direct, toward increased leaf development, the energies of the plant that would normally go to the formation of the seed head.

Topping tends to induce increased growth of the leaves, as well as increase the quality of the tobacco itself. When this is done, however, the growth of axillary shoots (suckers) at the base of the leaf petioles begins vigorously. If the suckers are not removed, or controlled in some other manner, too much of the plant energy will be sapped, with the result that low quality leaves will be produced over the whole plant. Chemical treatment with maleic hydrazide and certain other chemicals is generally used to prevent the growth of the suckers, thus avoiding the cost of manual removal. However, many of these materials cause deformation or burning of the tobacco leaves, especially if the dosage levels are not kept low.

It is, therefore, one object of this invention to control the growth of plants or portions of plants in such a way so as to increase the yields of desired portions and/or decrease the yields of undesirable portions of the plant.

It is also an object of this invention to provide a method of treating plants so as to improve their quality, decrease the use of nutrients, cut costs of manual operation and improve the appearance of the plant by using chemical treatment with a group of compounds which will not cause undesirable changes in the plant.

Another object of the invention, with respect to tobacco plants, is to provide a method to inhibit the growth of axillary buds after topping of the plant.

A still further object is to provide a chemical treatment of tobacco plants wherein the possibility of chemical deterioration and contamination of the leaves is substantially decreased.

Additional objects, if not specifically set forth herein, will be readily apparent to those skilled in the art from the detailed description of the invention which follows.

It has now been discovered that oxygen containing compounds having about 3–10 methylene groups per non-carbonyl oxygen atom are effective plant growth regulators. All of the compounds of this select class contain at least one free hydroxy group. Further, a subgeneric portion of the class of compounds may be defined as aliphatic alcohols having either an ester or ether linkage connected to a carbon atom which is adjacent to the carbon atom containing the free hydroxy group.

Generally speaking, the method of preventing the growth of suckers in a tobacco plant comprises applying the hydroxy compound, before any substantial sucker growth occurs, to the top portion of the stalk in an amount sufficient to substantially completely coat the sucker-producing areas of the stalk. The sucker-controlling liquid is permitted to run down the stalk and coat the leaf axils thereby arresting the growth of the sucker buds.

Some of the compounds which are useful in the practice of this invention, and which fall under the above definition are the acyclic aliphatic monohydric alcohols of about 3–10 carbon atoms. Examples include propyl alcohols, butyl alcohols, amyl alcohols, hexyl alcohols, heptyl alcohols, octyl alcohols, nonyl alcohols, and decyl alcohols. Of specific importance are the even-numbered normal alcohols, i.e., n-butanol, n-hexanol, n-octanol and n-decanol. For reasons set out more thoroughly below, n-octanol is the most preferred alcohol.

Another group of compounds useful in the practice of the invention can be defined by the following formula:

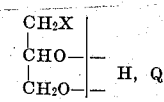

wherein X is hydrogen, halogen (usually chlorine or bromine) and hydroxyl; and Q is an alkyl, alkenyl or acyl radical of about 8–30 carbon atoms. As can be seen, this class of compounds are aliphatic alcohols having either an oxygen ether linkage or oxygen ester linkage connected to a carbon atom which is adjacent to the carbon atom containing the free hydroxy group. Representative examples of the hydroxy ethers comprise compounds wherein Q is octyl, decyl, dodecyl, tetradecyl, cetyl and octadecyl. More specifically, suitable hydroxy ethers are represented by n-dodecyl 2-hydroxypropyl ether, n-dodecyl 2-hydroxy-3-chloropropyl ether, decyl 2-hydroxypropyl ether, dodecyl 2-(1-hydroxypropyl) ether, and tetradecyl 2-hydroxypropyl ether.

Representative examples of the hydroxy esters are the monoglycerides wherein the acyl radical contains 8–30 carbon atoms and is composed of carbon, hydrogen and oxygen. Specific examples include glycerol monolaurate, glycerol monostearate, glycerol monooleate, glycerol monooctanoate, glycerol monopalmitate, glycerol monomyristate and glycerol monodocosanoate.

In order to retard the growth of tobacco suckers, the compounds may be applied to the sucker-producing areas of the tobacco plant in the form of solutions, emulsions, pastes, dust formulations, etc. Since most of the hydroxy compounds utilized in accordance with the teachings of this invention are water-insoluble, a liquid emulsion is usually prepared. The emulsifying agent is usually present in an amount up to 30 percent based on the weight of the active ingredient. Selection of a suitable emulsifying agent may be taken from a wide range of substances. Polyoxyalkylene substances may be used alone or in combination with a sulfonate such as an alkyl aryl sulfonate. A specific emulsifier is Tween-20 which is polyoxyethylene Sorbitan monolaurate. In this connection it should be noted that the hydroxy ethers and monoglycerides are substantially self-emulsifiable. If a solvent is used to disperse the active compound in the water solution, one should take care to be certain that the solvent is non-phytotoxic.

If a dust formulation is desired, one may prepare the formulation of solid ingredients by dissolving the active ingredient in a suitable solvent, contacting the liquid on the solid carrier and allowing the solvent to evaporate. Examples of solid carriers include bentonite, vermiculite, talc, pyrax, attaclay, etc. Pastes and greases may also be utilized.

In several of the prior art processes, dusting and spraying are objectionable since a majority of the chemicals used are phytotoxic and cause excessive damage to the tobacco leaf. The compounds defined by this invention, on the other hand, are generally non-phytotoxic, especially at the levels used, and may be applied by spraying or dusting without adversely affecting the tobacco leaves.

Generally the materials are applied as emulsions to the upper leaves of previously topped and suckered tobacco plants so that a specified amount of material is applied to each plant. Generally the solutions are applied by spraying the plant with emulsion containing about ½ to 4 and preferably about 1–2 milliliters of active ingredient.

Substantially complete application is made possible by the fact that tobacco leaves are spirally spaced about the stalk of the plant. The material will usually drain down along the stem and come in contact with the axillary buds. Since no one leaf is positioned directly above another, free access of the sucker-controlling film to each axil is insured.

In the examples that follow, the active ingredients were applied to field grown Burley tobacco. The ingredients were applied as emulsions with Tween-20 (polyoxyethylene Sorbitan monolaurate) as the emulsifier at the rate of 1 milliliter active ingredient in 30 milliliters of emulsion (with ¼ milliliter of emulsifier) per plant. The results were obtained after comparing green weight of suckers of treated plants with the green weight of untreated plants which acted as a control. An additional control comprised plants treated with maleic hydrazide at its common use level which is the standard agent used to desucker tobacco plants.

| Compounds | % Sucker Control |
|---|---|
| Aliphatic Alcohols | |
| n-octanol | 99 |
| n-decanol | 96 |
| n-dodecanol | 50 |
| n-hexadecanol | 28 |
| Hydroxy Ethers | |
| n-dodecyl 2-hydroxypropyl ether | 100 |
| n-dodecyl 2-hydroxy-3-chloropropyl ether | 86 |
| Monoglycerides (commercial 40%) | |
| Glycerol monolaurate | 71 |
| Glycerol monostearate | 79 |
| Glycerol monooleate | 79 |
| Others | |
| maleic hydrazide | 70 |
| n-dodecyl acetate | 43 |
| 2-nonadecanone | 21 |
| methyl epoxy stearate | 36 |

Of the compounds tested above, those that controlled the axillary sucker growth to a satisfactory degree (above 70 percent sucker control) also produced no substantial detrimental or phytotoxic effects. Specifically, n-octanol treated plants exhibited substantially no excessive leaf drop, leaf burn, leaf breakage, epinastic effects, etc., and there were no gross adverse visual effects on the cured leaf.

While the above examples are directed mainly to retarding the growth of tobacco suckers, it should be noted that the compositions are also suitable for inhibiting the sprouting of potatoes and slowing down grass growth to reduce frequency of mowing. Other crops which can be profitably treated include tilled crops such as soybeans and corn, and fruit trees.

Obviously many modifications and variations of the invention as hereinbefore set forth may be made without departing from the spirit and scope thereof, and, therefore, only such limitations should be applied as are indicated in the claims which follow.

We claim:

1. A method of controlling the growth of the axillary shoots of a tobacco plant which comprises contacting said shoots with a growth-controlling amount of n-dodecyl 2-hydroxypropyl ether.

2. A method of controlling the growth of the axillary shoots of a tobacco plant which comprises contacting said shoots with a growth controlling amount of an alkyl hydroxypropyl ether wherein the alkyl group contains 8–18 carbon atoms.

3. A method of controlling the growth of the axillary shoots of the tobacco plant which comprises contacting said shoots with a growth controlling amount of alkyl hydroxypropyl ether selected from the group consisting of n-dodecyl 2-hydroxypropyl ether, n-dodecyl 2-(1-hydroxypropyl) ether and n-dodecyl 2-hydroxy-3-chloropropyl ether.

* * * * *